United States Patent Office 3,475,577
Patented Oct. 28, 1969

3,475,577
APPARATUS FOR HIGH FREQUENCY-HEATING IN A WAVE GUIDE
Gerhard Gäde, Hamburg, Uwe Wolfgang Rische, Hamburg-Bergedorf, and Geert Rösler, Hamburg, Germany, assignors, by mesne assignments, to U.S. Philips Corporation, New York, N.Y., a corporation of Delaware
Filed Oct. 18, 1967, Ser. No. 676,293
Claims priority, application Germany, Nov. 2, 1966, P 40,718
Int. Cl. H05b 9/06
U.S. Cl. 219—10.55                                13 Claims

ABSTRACT OF THE DISCLOSURE

In a microwave oven including a serpentine waveguide, more uniform heating is achieved by means of an energy reflecting system that includes a plurality of reflecting elements spaced apart approximately one-half the wavelength of the microwave heating energy and movable through the waveguide in a direction parallel to the longitudinal axis thereof.

---

The present invention relates to high frequency heating apparatus for heating thin webs of dielectric material. In particular, the invention relates to a high frequency heating device comprising a wave guide having two longitudinal slits in opposed walls which extend over at least part of the length of the wave guide. The web is placed in the plane (slit plane) which extends through the slits in the direction of the electric field and parallel to the longitudinal axis of the wave guide movable reflecting means are arranged in the wave guide to influence the wave.

It is known, for example, from French patent specification 1,264,758, to draw thin webs of a material having dielectric losses, for example, consisting of textile fabrics, paper or synthetic resin, continuously through a wave guide and to heat them in the field of an electromagnetic wave. The web travels through two slits accommodated at the height of the symmetry plane in the wave guide wall and extending in the direction of the electric field and parallel to the axis of the wave guide. The electric field of the electromagnetic wave occurring in the wave guide lies in the plane of the web material so that a maximum amount of energy in the form of heat is withdrawn from the wave.

A similar device may alternatively be constructed so that the wave guide is folded one or more times, slits being provided in the straight sections of the wave guide through which the thin web is guided. In each section of the wave guide the web absorbs energy from the field so that the wave which is propagated in the wave guide is more strongly attenuated and a more rapid heating is obtained.

Such high frequency waveguide apparatus are frequently used for drying moist webs, for evaporating solvents, for example, from lacquers, paints or adhesives or for hardening thin layers of such substances, for example, melamine paints or suspension paints. However, a problem arises in that standing waves are produced which are the result of energy reflections. These reflections may be produced by the material to be treated and by the bends connecting the straight sections of the wave guide together. In substances having low dielectric losses it is often necessary to produce an additional reflection at the end of the wave guide in order to amplify the field and improve the conversion of the energy.

As a result of the irregular variation of the field strength in the direction of propagation of the wave, the layer is not uniformly heated. This is particularly disturbing in processes which are highly sensitive to temperature and in which uniform heating is required. In practice, it is not possible to obtain uniform heating for certain processes by means of the known plotted wave guides.

This is the case, for example, in polymerisation processes and other conversions which occur, for example, within a temperature range of, for example, 1%. In order to remain within this range, the power may not vary more than 1%, that is to say, in no section of the wave guide may the standing wave ratio $R = U_{max}/U_{min}$ exceed 1.005, a value which is very difficult to achieve with very good and closely matched transmission lines.

Various expedients have become known for uniformly distributing the energy in an apparatus for high-frequency-heating of the above-mentioned type. For example, from British patent specification 668,835, it has become known to provide a reflecting element with varying reflection coefficient at the end of the wave guide, for example, a rotating metal member or a reflecting wall which reciprocates periodically in the longitudinal direction of the wave guide in order to produce varying wave patterns in the wave guide. However, this does not provide the desired result because the variation may often occur in a more or less discontinuous manner so that, in the longitudinal direction of the wave guide, areas with different field strengths occur. Therefore, on a time average the energy is not distributed uniformly over the whole volume of the material to be treated. Aside from the fact that during the movement of such reflecting elements one wave pattern may jump into another, the phase and also the intensity of the reflected energy vary. As a result, not only the phase but also the amplitudes in the maxima and minima of the standing wave vary.

The known movable reflecting elements are therefore not entirely satisfactory to achieve the end in view.

It is an object of the invention to provide an apparatus for high frequency-heating of the above-mentioned type in which the drawbacks of the known apparatus for the uniform distribution of the energy are avoided and with which a uniform heating, even of sensitive materials, is obtained. According to the invention, such an apparatus comprises at least one reflection system which is movable in the direction of the longitudinal axis of the wave guide and is periodically repeated at distances of half a wavelength. The reflection system travels through the wave guide in the said direction and over a distance of half a wave-length, and moves proportionally with time.

The invention is based on the concept that with reflecting elements, the energy in the material, on an average with time, can be distributed uniformly only if the phase of the reflections varies proportionally with time and the amplitude of the reflected energy always remains constant. However, this cannot be realised with a reflecting element having a constant modulus of the reflection coefficient which moves proportionally with time, at least not when the reflecting element performs a rotating movement or a reciprocating movement in the longitudinal direction of the wave-guide. During the rotating movement the phase does not vary proportionally with time and modulus of the reflection coefficient does not remain constant. In a reciprocating movement of the reflecting element, very high speeds are required so that the forces necessary to accelerate the masses at the reversal points of the movement become much too large. High speeds are required owing to the comparatively high transport speed of the web to be heated and because during the dwell of a piece of web in a section of the wave-guide, the standing wave produced by reflection has to be moved up and down several times in the longitudinal direction of the wave guide, namely over such a distance that the energy maxima and minima fall at the same spot at least once after one another.

The apparatus for high frequency-heating according to the invention meets this requirement. The reflection system is passed through the wave guide in the longitudinal direction of the wave guide in one direction, preferably in a circulating manner, so that the problem of the accelerating forces at the reversal points are avoided and the standing wave can be shifted proportionally with time. Since the reflection system moves totally over one half wave length in the longitudinal direction of the wave guide and this movement is invariably repeated after a displacement over half a wape-length, sudden phase variations of the reciprocating standing wave are avoided.

A favourable embodiment of the reflection system consists of a circulating transporting device on which reflecting elements are spaced apart at half wave-length interval. The reflecting elements, viewed in the longitudinal direction of the wave guide, have small dimensions relative to the wave-length and are arranged to extend through a longitudinal slit in one of the wide sides of the wave guide. Each element travels therein a distance of half a wave-length.

According to another embodiment of the invention, the reflection system may consist of a transport tape composed of a low-loss dielectric material with low dielectric constant which extends at right angles to the longitudinal direction of the waveguide through longitudinal slits. On the tape is a pattern of regularly spaced inclined lines. Each line is covered with a row of reflecting elements in the form of plates which are arranged at equal distances so that, viewed in the longitudinal direction of the wave guide, the distance between the beginning of a row and the end of the preceding row is approximately equal to half a wave-length reduced by the distance between successive reflecting elements, likewise viewed in the longitudinal direction of the wave guide.

In order that the invention may readily be carried into effect two embodiments thereof will now be described in greater detail, by way of example, with reference to the accompanying drawings, in which:

FIGURE 1 is an apparatus for high frequency-heating comprising a wave-guide with slits;

FIGURES 2 and 3 diagrammatically show two different embodiments of reflection systems according to the invention for a high frequency heating apparatus;

Figure 1:
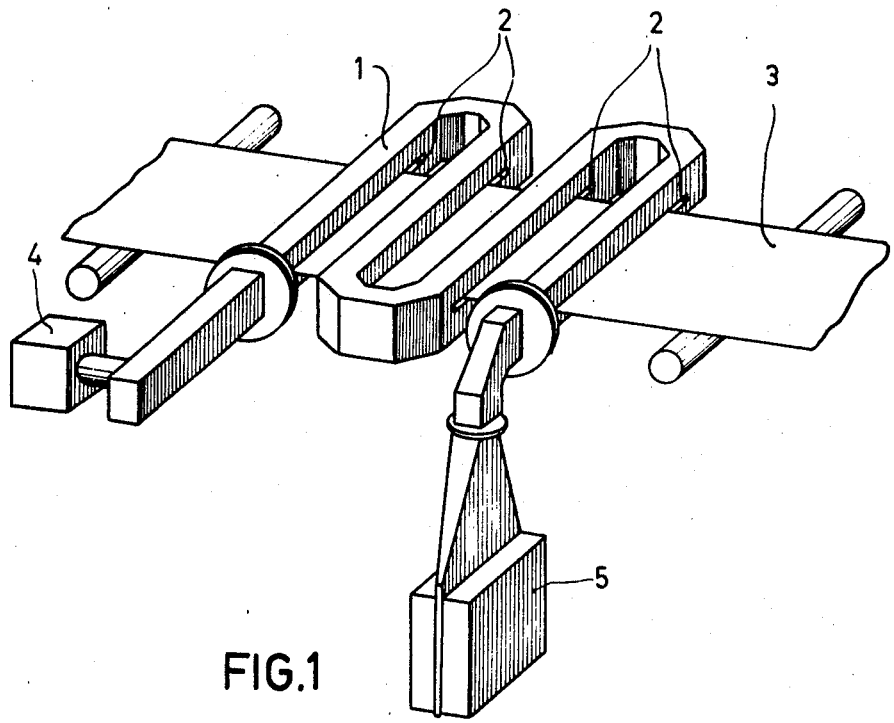

The apparatus shown in FIGURE 1 compares a folded rectangular wave guide 1 with slits 2 which are provided in the wide sides. By means of a transportation device, not shown, the web 3 to be heated is guided through said slits. A generator 4 feeds the wave-guide with high frequency energy. At the end remote from the generator, the wave-guide is terminated by a resistor 5 in which the high frequency energy not absorbed by the web 3 is dissipated.

As a result of reflections in the possibly inhomogeneous material, at the bends which connect the individual sections of the wave-guide together, or at the resistor 5, standing waves will inevitably be formed in the wave-guide. In order to achieve a uniform distribution of the heating energy in spite of the standing waves, a reflection system is provided in the track of the wave guide. The arrangement of this system depends upon various conditions, inter alia upon the value of the effective damping through the material and upon the nature of the wave pattern in the wave guide. As a rule, the reflection system must be provided at the place where the strongest disturbance as a result of reflection occurs. It should be taken into account, however, that at the place in question the high frequency wave may not yet be attenuated to such an extent that the correction produced by the reflection system has little influence. In the case of a large effective damping it is not effective, for example, to arrange the reflection system at the end of the wave guide. Cases may present themselves in which more than one reflection system is necessary, each having a reflection coefficient which is adapted to the circumstances.

Figure 2:
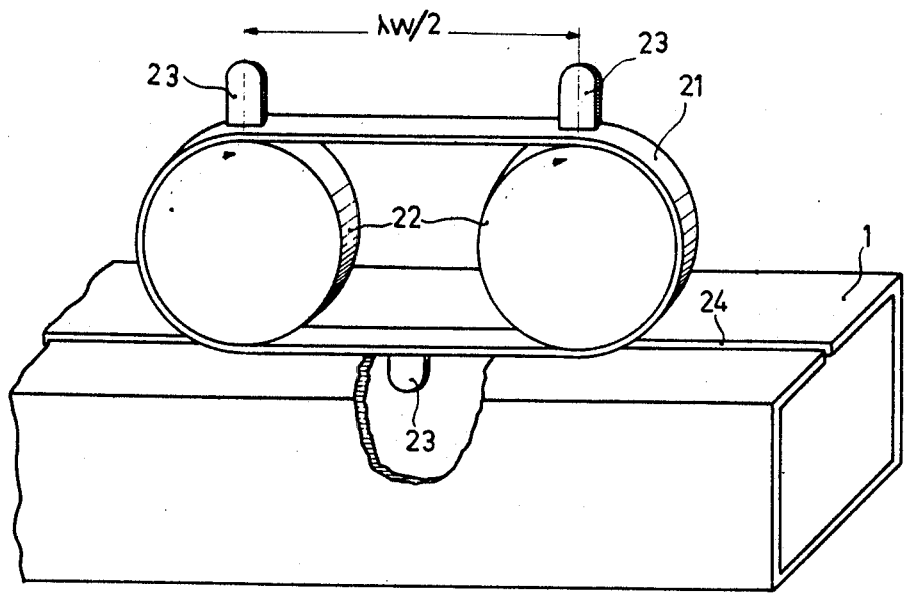

The reflection system shown in FIGURE 2 comprises an endless tape 21 of insulating material travelling over two driving rollers 22 and supporting three reflecting elements 23 at a mutual distance $\lambda_W/2$ ($\lambda_W$=the wave-length in the wave guide at the average operating frequency $f_0$ of the generator 4). The reflecting elements 23 are guided at constant speed through the interior of the wave guide 1 by the tape 21 through a slit 24 arranged in the centre of the wide side of the wave guide 1, namely over a distance of $\lambda_W/2$. The diameter of the rollers 22 is chosen so that the total length of the transporting tape is $3.\lambda_W/2$.

With this arrangement, the movement of each active element 23 of the reflection system is repeated each time after it has covered a distance of $\lambda_W/2$. Since, in a homogeneous line, no impedance transformation takes place over a length of $N.\lambda_W/2$, the reflection produced by the periodic insertion of the reflecting element in the wave guide over the distance $\lambda_W/2$ is repeated without transition. In this manner, we obtain a uniform variation of the phase of the standing wave in the wave guide over a distance $\lambda_W/2$. The modulus of the reflection coefficient, which otherwise depends upon the shape, the material and the depth of penetration in the wave-guide of the reflecting element 23, remains constant so that the amplitude of the reciprocating standing wave does not vary, as is necessary for a uniform distribution of the energy over the web.

The reflecting elements 23 may be manufactured from any conductive material or from a low-loss dielectric material having a comparatively large dielectric constant. They may be in the form of a disk or a pin.

Figure 3:
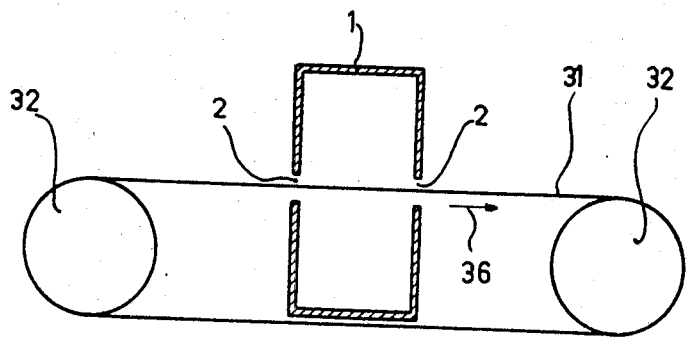
Figure 4:
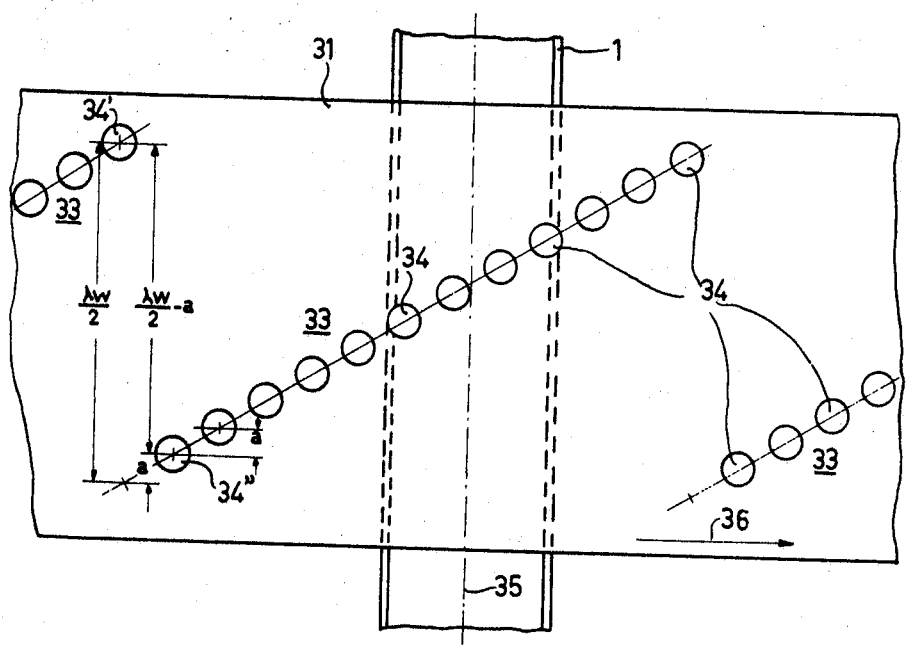
FIGURE 4 shows a detail of the reflection system shown in FIGURE 3.

In the embodiment shown in FIGURES 3 and 4, the reflection system consists of an endless transportation tape 31 of low-loss dielectric material having a low dielectric constant. The tape is moved at constant speed over two rollers 32 through the slit 2 in the wave-guide 1 and at right angles to its longitudinal direction 35. Rows 33 of reflecting elements 34 in the form of disks are provided on the tape according to a pattern of straight lines which succeed each other regularly and all the lines make the same angle with the edge of the tape. In the longitudinal direction 35 of the wave guide 1, the rows are shifted relative to each other but in the direction of movement of the tape 31, each row forms an uninterrupted continuation of the preceding row. The distance between the first plate of a row, for example, the plate 34′, and the last plate 34″ of the preceding row, viewed in the longitudinal direction 35 of the wave guide, is approximately equal to half the wave-length $\lambda_W/2$ reduced by the distance $a$ between adjacent plates, likewise viewed in the longitudinal direction 35. It has been found that the distance between the rows in the longitudinal direction 35 must not be chosen to be exactly equal to $(\lambda_W/2) - a$ and that a small correction, to be determined by measurements, should be provided in order to obtain an undisturbed transition from one row to the other.

Dependent upon the desired modulus of the reflection coefficient, the plate 34 may be manufactured from conductive material or from dielectric material having not too low a dielectric constant. The modulus of the reflection coefficient is also determined by the diameter and the mutual distance between the plates.

When the tape 31 travels at constant speed in a given direction, for example, in the direction of the arrow 36, through the wave guide 1, the phase of the reflection, and hence the standing wave, is shifted proportionally with time in the longitudinal direction of the wave guide from the beginning to the end of a row, without the modulus of the reflection coefficient varying. The shift is half a wavelength so that, as is desired, the energy absorbed by the web is uniformly distributed. Since the rows of plates are mutually shifted over $\lambda_W/2$, one row follows the other row in succession, and without transition, so that no step-like variations in the phase or of the modulus of the reflection coefficient occur.

With the reflection system shown in FIGURES 3 and 4, it is possible, even at comparatively low speeds of the tape 31, to shift the phase of the reflection at high speed.

The initial phase of the reflection may be fixed by the choice of the place in the wave guide where the reflection system is arranged.

A shift of the standing wave proportional with time at constant amplitude of the reflection, and hence constant amplitude of the standing wave, as described above, can be realised effectively only when the generator 4 always supplies the same output power to the load independent of the load impedance. As a result of the movement of the reflecting element, however, the load impedance varies within certain limits so that the power supplied by the generator also varies, at least when the internal resistance of the generator is not negligible.

This phenomenon will be explained with reference to the diagram shown in FIGURE 5 of a practical generator consisting of a magnetron oscillator having a frequency $f_0$ of 2,450 mc./s. and a maximum output power of 2,250 watts. The generator is connected to a waveguide 1 having internal dimensions 43 x 86 mms. which is provided with a reflection system as shown in FIGURES 3 and 4. Each row of reflecting elements consists of 12 copper plates having a diameter of 10 mms. and a thickness of 0.05 mm. The elements are arranged along a line at an angle of 30° with the edge of the tape support 31. The distance between the plates is 15 mms. and the distance $$\frac{\lambda_W}{2} - a$$

is 84 mm.

Figure 5:
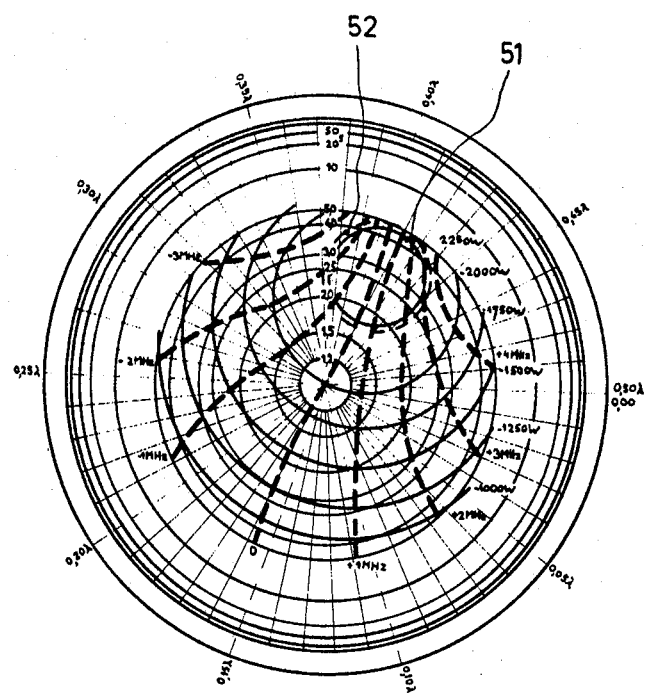
FIGURE 5 is a load diagram of a magnetron generator for a high frequency heating apparatus according to the invention.

In the generator diagram shown in FIGURE 5, the solid line curves denote the output power as a function of the load impedance with the output power as a parameter. The region in which the generator supplies approximately the maximum power lies within the circle 51. The broken line circle 52 represents the curve in question for the case where a material having a given attenuation traverses the wave guide and the reflection system is in operation. In order to locate the curve at the place denoted by the broken-line circle 52, an impedance transformer is arranged in the proximity of the generator output. As a result, the load impedance traverses a region in which the output power of the generator is substantially constant.

With a view to the stability of the generator, it is not always possible to transform the load so favourably as in the case denoted by the circle 52. In such cases the energy distribution over the web to be heated may be improved by adapting the amplitude or the phase of the reflection, during the period of the reflection system, to the variation of the output power produced by the system in such manner that this power varies as little as possible. In order to realise this, point measurements must be performed and the reflection system adjusted accordingly.

In the device shown in FIGURE 2, the relative adaptation may be obtained, for example, by varying the depth of penetration of the reflecting elements 23 during the period of the reflection system. This may be done, for example, by controlling the transport tape 21 in the desired manner by means of a curved track or guide rollers.

In the reflection system shown in FIGURES 3 and 4, for example, the dimensions of the reflection elements 34 may be chosen to be different so that the modulus of the reflection coefficient is varied. In addition, it is possible to control the variation of the phase variation of the reflection by arranging the reflection elements 34, not according to a straight line, but according to a curved line the shape of which is adapted to the output power of the generator.

What is claimed is:

1. High frequency heating apparatus for heating thin strips of material comprising, a wave guide having two longitudinal slits in parallel walls of the wave guide to define a channel for the passage of said strip material, a high frequency generator coupled to said wave guide to propagate high frequency wave energy along the longitudinal axis of the wave guide, the strip material being arranged in the plane defined by the slits which extends in the direction of the electric field of the wave energy and parallel to the longitudinal axis of the wave guide, a system of energy reflecting elements arranged to repeat at half wave-length intervals, means for moving said reflecting elements through the waveguide at a uniform velocity in one direction parallel to the longitudinal axis of the wave guide and through a distance of half a wave-length and is displaced proportionally with time of said high frequency energy.

2. An apparatus as claimed in claim 1 wherein said reflecting elements are arranged so that the modulus of the reflection coefficient thereof is constant during the heating period.

3. An apparatus as calmed in claim 1 wherein said reflecting elements are arranged so that the modulus of the reflection coefficient or the phase of the reflection thereof varied during the heating period in accordance with the variation of the output power of the generator produced by the reflection thereby to maintain the output power substantially constant.

4. An apparatus as claimed in claim 1 wherein the reflection system comprises a circulating transportation device on which reflection elements are spaced apart at a distance of half a wave-length, said wave guide including a longitudinal slit in a third wall of the wave guide that extends over a distance of at least half a wave-length, said transportation device being arranged to move said elements through said longitudinal slit in the third wall of the wave guide.

5. An apparatus as claimed in claim 4 wherein said transportation device is arranged so that the depth of penetration of the reflecting elements in the wave-guide is substantially constant during the heating period.

6. An apparatus as claimed in claim 4 wherein said transportation device is arranged so that the depth of penetration of the reflecting elements in the wave-guide varies during the heating period in accordance with the variation of the output power of the generator.

7. An apparatus as claimed in claim 1 wherein the reflection system comprises a transport tape which extends at right angles to the longitudinal axis of the wave guide and passes through longitudinal slits therein, said transport tape containing a plurality of reflecting elements arranged in rows in a pattern of inclined lines located at regular distances, said tape being composed of a low-loss dielectric material having a low dielectric constant, said rows being arranged so that, viewed in the direction of the longitudinal axis, the distance between the beginning of a row and the end of the preceding row is approximately equal to half a wave length minus the distance between two successive reflecting elements, likewise viewed in the direction of the longitudinal axis.

8. An apparatus as claimed in claim 7 wherein the rows of reflecting elements constitute straight lines and the reflecting elements have the same dimensions.

9. An apparatus as claimed in claim 7 wherein the dimensions of the reflecting elements of a row vary in accordance with the variation of the output power of the generator.

10. An apparatus as claimed in claim 7 wherein the rows of reflecting elements constitute curves with a variation which is matched to the variation of the output power of the generator.

11. An apparatus as claimed in claim 1 characterized in that by impedance transformation the load is matched to the generator output power in such manner that the generator operates in the region of the generator diagram (FIGURE 5) in which the output power varies little.

12. Apparatus as claimed in claim 7 wherein said reflecting elements comprise a plurality of evenly spaced metal plates.

13. High frequency heating apparatus comprising, a waveguide having at least two aligned slots extending longitudinally along opposed walls of the waveguide so as to define a channel for the passage of a dielectric material to be heated, a source of high frequency energy coupled to said waveguide to propagate high frequency energy along the longitudinal axis of the waveguide, a plurality of energy reflecting elements arranged in a repetitive pattern with corresponding elements spaced apart by half wavelength intervals of the high frequency energy, and means for moving said elements unidirectionally through the waveguide parallel to the longitudinal axis thereof for a distance of one-half wavelength of the high frequency energy.

References Cited

FOREIGN PATENTS

| | | |
|---|---|---|
| 1,067,265 | 5/1967 | Great Britain. |
| 1,370,675 | 7/1964 | France. |
| 1,472,603 | 1/1967 | France. |

JOSEPH V. TRUHE, Primary Examiner

L. H. BENDER, Assistant Examiner

U.S. Cl. X.R.

219—10.61

PO-1050
(5/69)

UNITED STATES PATENT OFFICE
CERTIFICATE OF CORRECTION

Patent No. 3,475,577                    Dated October 28, 1969

Inventor(s) GERHARD GADE ET AL

It is certified that error appears in the above-identified patent and that said Letters Patent are hereby corrected as shown below:

Column 2, line 5, "plotted" should read -- slotted --;

Column 2, line 57, "perorms" should read -- performs --;

Column 2, line 61, after "and" insert -- the --;

Column 3, line 13, "wape" should read -- wave --;

Column 3, line 53, "compares" should read -- comprises --;

Column 3, line 57, after "A" insert -- magnetron --;

Column 6, lines 24 & 25, cancel "and is displaced proportionally with time";

Signed and sealed this 1st day December 1970.

(SEAL)
Attest:

Edward M. Fletcher, Jr.
Attesting Officer

WILLIAM E. SCHUYLER, JR.
Commissioner of Patents